United States Patent
Cai et al.

(10) Patent No.: US 12,206,078 B2
(45) Date of Patent: *Jan. 21, 2025

(54) CHARGING METHOD FOR ELECTROCHEMICAL DEVICE, ELECTRONIC DEVICE AND READABLE STORAGE MEDIUM

(71) Applicant: DONGGUAN POWERAMP TECHNOLOGY LIMITED, Dongguan (CN)

(72) Inventors: Yangsheng Cai, Dongguan (CN); Juan Jin, Dongguan (CN); Xiang Li, Dongguan (CN); Feilong Guo, Dongguan (CN)

(73) Assignee: DONGGUAN POWERAMP TECHNOLOGY LIMITED, Dongguan (CN)

( * ) Notice: Subject to any disclaimer, the term of this patent is extended or adjusted under 35 U.S.C. 154(b) by 621 days.

This patent is subject to a terminal disclaimer.

(21) Appl. No.: 17/362,870

(22) Filed: Jun. 29, 2021

(65) Prior Publication Data

US 2021/0328275 A1   Oct. 21, 2021

Related U.S. Application Data

(63) Continuation of application No. PCT/CN2020/080850, filed on Mar. 24, 2020.

(51) Int. Cl.
   *H01M 10/44*   (2006.01)
   *H01M 4/525*   (2010.01)
   H01M 4/02    (2006.01)

(52) U.S. Cl.
   CPC .......... *H01M 10/44* (2013.01); *H01M 4/525* (2013.01); *H01M 2004/021* (2013.01); *H01M 2004/028* (2013.01)

(58) Field of Classification Search
   CPC ................. H01M 10/44; H01M 4/525; H01M 2004/021; H01M 2004/028;
   (Continued)

(56) References Cited

U.S. PATENT DOCUMENTS

| 8,513,919 B2 | 8/2013 | Bhardwaj et al. | |
|---|---|---|---|
| 2011/0316487 A1* | 12/2011 | Nakai | H01M 4/485 320/160 |

(Continued)

FOREIGN PATENT DOCUMENTS

| CN | 106451640 A | 2/2017 |
|---|---|---|
| CN | 106785132 A | 5/2017 |

(Continued)

OTHER PUBLICATIONS

Notice of Reasons for Refusl, JP2021-525859, Aug. 9, 2022, 10 pgs.

(Continued)

*Primary Examiner* — Paul Dinh
(74) *Attorney, Agent, or Firm* — Morgan, Lewis & Bockius LLP

(57) ABSTRACT

A charging method for an electrochemical device includes the following steps: in a first cycle stage, a charging stage of the first cycle stage has a first cut-off voltage; and in a second cycle stage, a charging stage of the second cycle stage has a second cut-off voltage, and the second cut-off voltage is less than the first cut-off voltage. According to the charging method for an electrochemical device, an electronic device, and a readable storage medium provided in the present application, the risk of cyclic gas generation of the electrochemical device can be effectively prevented, and the service life of the electrochemical device can be improved.

19 Claims, 5 Drawing Sheets

(58) Field of Classification Search
CPC ....... H01M 10/425; H01M 2010/4271; H01M 10/48; H01M 10/446; Y02E 60/10; H02J 7/007182
USPC .......................................................... 320/130
See application file for complete search history.

(56) References Cited

U.S. PATENT DOCUMENTS

| | | | |
|---|---|---|---|
| 2018/0109129 | A1 | 4/2018 | Dai et al. |
| 2021/0143661 | A1* | 5/2021 | Xu .................... H01M 10/443 |
| 2021/0391742 | A1* | 12/2021 | Guan .................. H02J 7/00712 |
| 2021/0399568 | A1* | 12/2021 | Huang ................. H02J 7/0047 |

FOREIGN PATENT DOCUMENTS

| | | |
|---|---|---|
| CN | 207765536 U | 8/2018 |
| CN | 110233247 A | 9/2019 |
| JP | H-1014123 A | 1/1998 |
| JP | 2001-309568 A | 11/2001 |
| JP | 2005-192383 A | 7/2005 |
| JP | 2010-081683 A | 4/2010 |
| WO | WO2016/152861 A1 | 9/2016 |
| WO | WO2020/043151 A1 | 3/2020 |

OTHER PUBLICATIONS

Office Action, CN202080001997.6, Dec. 1, 2023, 6 pgs.
International Search Report and Written Opinion, PCT/CN2020/080850, Dec. 29, 2020, 8 pgs.—No Translation Available.

* cited by examiner

CHARGING METHOD FOR ELECTROCHEMICAL DEVICE, ELECTRONIC DEVICE AND READABLE STORAGE MEDIUM

CROSS REFERENCE TO RELATED APPLICATIONS

This application is a continuation of International Patent Application No. PCT/CN2020/080850, filed on 24 Mar. 2020, which is incorporated by reference herein its entirety.

TECHNICAL FIELD

The present application relates to the technical field of an electrochemical device, and in particular to a method for charging an electrochemical device, an electronic device, and a readable storage medium.

BACKGROUND

A lithium-ion battery is also often referred to as a lithium battery, and is an electrochemical device that can be charged and discharged. The lithium battery has been widely used in consumer products, digital products, power products, medical treatment and security and other fields. In the lithium battery, a high-nickel positive electrode active material system has the advantages of high energy density and high power density. However, the problem of high-temperature cyclic gas generation is common in applications, which is mainly caused by the fact that during high-voltage charging and discharging, the H2↔H3 phase transformation of the high-nickel positive electrode active material is accompanied by violent expansion and shrinkage of crystal lattices, as a result, the crystal lattices release oxygen, and further the active oxygen is caused to oxidize an electrolyte to generate gas. Since gas generation is a high risk for the lithium battery, it is necessary to solve the problem of gas generation of the lithium battery with a high-nickel positive electrode active material system at a design end of the lithium battery. At present, the strategy to improve the problem of high-temperature cyclic gas generation of the lithium battery with the high-nickel positive electrode active material system is mainly to enhance positive electrode protection through optimization of a chemical system. For example, the surface of the high-nickel positive electrode active material is coated, the content of a film-forming additive in the electrolyte is increased, and the like. However, the above strategy is accompanied by the loss of dynamic performances, such as temperature rise and poor low-temperature discharging performances of the lithium battery, and can only delay the gas generation to the greatest extent.

SUMMARY

In view of this, it is necessary to provide a charging method for an electrochemical device, an electronic device, and a readable storage medium, which can effectively solve the defect of cyclic gas generation without affecting the battery use experience of a user.

An embodiment of the present application provides a charging method for an electrochemical device. The charging method includes: in a first cycle stage, a charging stage of the first cycle stage having a first cut-off voltage; and in a second cycle stage, a charging stage of the second cycle stage having a second cut-off voltage, wherein the second cut-off voltage is less than the first cut-off voltage.

According to some embodiments of the present application, the charging method includes n cycle stages in sequence, the n cycle stages are respectively defined as $i^{th}$ cycle stages, i=1, 2, ..., n, n is a positive integer greater than 1, a previous cycle stage of the $i^{th}$ cycle stage is defined as a $(i-1)^{th}$ cycle stage, the charging stage of the $i^{th}$ cycle stage has an $i^{th}$ cut-off voltage, the charging stage of the $(i-1)^{th}$ cycle stage has a $(i-1)^{th}$ cut-off voltage, and the $i^{th}$ cut-off voltage is less than the $(i-1)^{th}$ cut-off voltage.

According to some embodiments of the present application, the $i^{th}$ cycle stage includes a constant-voltage charging stage, and a voltage value of the constant-voltage charging stage of the $i^{th}$ cycle stage is equal to a value of the $i^{th}$ cut-off voltage.

According to some embodiments of the present application, a cut-off current of the constant-voltage charging stage of the $i^{th}$ cycle stage is defined as an $i^{th}$ cut-off current, a cut-off current of the constant-voltage charging stage of the $(i-1)^{th}$ cycle stage is defined as a $(i-1)^{th}$ cut-off current, and the $i^{th}$ cut-off current is greater than or equal to the $(i-1)^{th}$ cut-off current.

According to some embodiments of the present application, the $i^{th}$ cut-off current is 0.5 C to 6 C.

According to some embodiments of the present application, the $i^{th}$ cycle stage includes a constant-current charging stage, a current of the constant-current charging stage of the $i^{th}$ cycle stage is defined as an $i^{th}$ current, a current of the constant-current charging stage of the $(i-1)^{th}$ cycle stage is defined as a $(i-1)^{th}$ current, and the $i^{th}$ current is equal to the $(i-1)^{th}$ current.

According to some embodiments of the present application, the $i^{th}$ cut-off voltage is 3.8V to 4.3V.

According to some embodiments of the present application, the $i^{th}$ cycle stage has 10 to 500 cycles.

According to some embodiments of the present application, the electrochemical device includes an electrode assembly, the electrode assembly includes a positive electrode, a negative electrode and a separator, and the separator is disposed between the positive electrode and the negative electrode, wherein at least one of the positive electrode and the negative electrode has two or more tabs.

According to some embodiments of the present application, the electrode assembly has a wound structure, and at least one of the positive electrode and the negative electrode has a tab every two circles.

According to some embodiments of the present application, the positive electrode includes a positive electrode active material, and the positive electrode active material is at least one of the compounds represented by the chemical formula $Li_\alpha Ni_x Co_y M1_z M2_\beta O_2$, wherein $0.95 \leq \alpha \leq 1.05$, $0.6 \leq x < 1$, $0y < 0.4$, $0 < z < 0.4$, $0 \leq \beta \leq 0.02$, $x+y+z+\beta=1$, M1 is at least one element selected from the group consisting of Mn and Al, and M2 is at least one element selected from the group consisting of Mg, Ti, Zr, Nb, Y, Cr, V, Ge, Mo, and Sr.

According to some embodiments of the present application, the positive electrode active material has at least one of the following characteristics: (a) including secondary particles; (b) $Dv10 \leq 5.0 \, \mu m$; (c) $7.5 \, \mu m < Dv50 < 12.5 \, \mu m$; and (d) $Dv90 \leq 22.0 \, \mu m$; wherein Dv10 represents the particle size reaching 10% of a volume accumulation from a small particle size side in a volume-based particle size distribution; Dv50 represents the particle size reaching 50% of the volume accumulation from the small particle size side in the volume-based particle size distribution; and Dv90 represents the particle size reaching 90% of the volume accumulation from the small particle size side in the volume-based particle size distribution.

An embodiment of the present application provides an electronic device, including: an electrochemical device; and a processor used to execute the above charging method to charge the electrochemical device.

An embodiment of the present application provides a readable storage medium storing computer instruction, wherein when the computer instructions run on the electronic device, the electronic device is caused to execute the above charging method.

The embodiments of the present application can effectively alleviate the expansion of the electrochemical device due to gas generation by reducing the charge cut-off voltages during the cycle stages, thereby alleviating a capacity decay trend of the electrochemical device during the cycle without affecting the use experience of a user.

| Reference signs of main elements | |
|---|---|
| Electronic device | 100 |
| Computer program | 10 |
| Processor | 11 |
| Electrochemical device | 13 |
| Constant-current charging module | 101 |
| Constant-voltage charging module | 102 |
| Electrode assembly | 130 |
| Positive electrode | 131 |
| Negative electrode | 132 |
| Separator | 133 |

The following specific embodiments will describe the present application in more detail in conjunction with above-mentioned accompanying drawings.

DETAILED DESCRIPTION

The following clearly and completely describes the technical solutions in the embodiments of the present application in conjunction with the accompanying drawings in the embodiments of the present application. Apparently, the described embodiments are merely a part but not all of the embodiments of the present application.

Based on the embodiments in the present application, all other embodiments obtained by those of ordinary skill in the art without creative work are within the protection scope of the present application.

Figure 1:
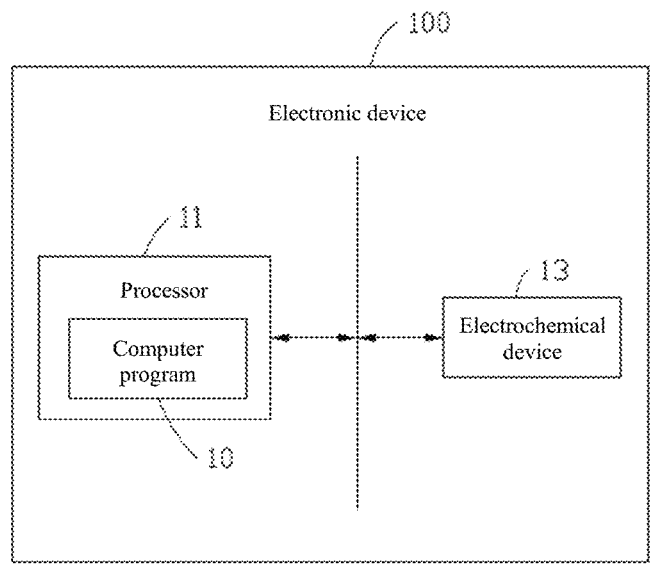
FIG. 1 is a schematic structural diagram of an electronic device according to an embodiment of the present application.

Please refer to FIG. 1, the electronic device 100 includes, but not limited to, at least one processor 11 and an electrochemical device 13. The above elements may be connected by a bus or directly connected. The charging method for an electrochemical device may be executed by the electronic device 100 to charge the electrochemical device 13.

In one embodiment, the at least one processor 11 is a device with a computational processing capability, such as a system on chip, a central processing unit (CPU), an advanced RISC machine (ARM) processor, a field programmable gate array (FPGA) and a dedicated processor. When the processor 11 executes a computer program stored in a memory included in the electronic device 100, the charging method is implemented. Or, the memory of the electronic device 100 stores a computer instruction, and when the processor 11 of the electronic device 100 executes the computer instruction, the electronic device 100 or the processor 11 executes the charging method.

It should be noted that FIG. 1 is only an example for illustrating the electronic device 100. In other embodiments, the electronic device 100 may also include more or fewer elements, or have different element configurations. The electronic device 100 may be an electric motorcycle, an electric bicycle, an electric power tool, an electric vehicle, a drone, a mobile phone, a tablet computer, a personal digital assistant, a personal computer, or any other suitable rechargeable equipment.

In one embodiment, the electrochemical device 13 is a rechargeable battery for providing electrical energy to the electronic device 100. For example, the electrochemical device 13 may be a lithium-ion battery, a lithium polymer battery, or the like.

In one embodiment, the electrochemical device 13 is preferably the lithium battery with a high-nickel positive electrode active material system. The electrochemical device 13 may be logically connected to the processor 11, so that the functions such as charging, discharging, and power consumption management can be realized for the electrochemical device 13 by the processor 11.

In other embodiments, the charging method may also be executed by a charging device to charge the electrochemical device 13.

Figure 2:
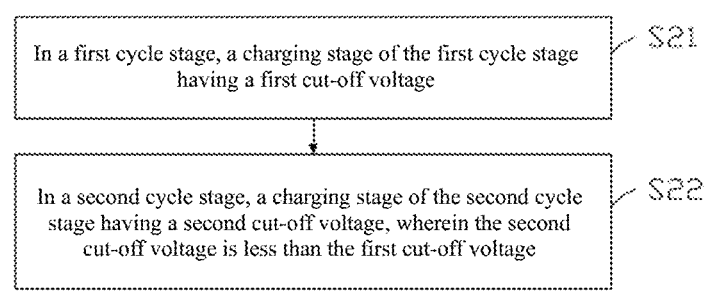
FIG. 2 is a flowchart of a charging method for an electrochemical device according to an embodiment of the present application.

Please refer to FIG. 2, which is a flowchart of a charging method for an electrochemical device according to an embodiment of the present application. The charging method for an electrochemical device may include the following steps:

Step S21: in a first cycle stage, a charging stage of the first cycle stage has a first cut-off voltage.

In one embodiment, the first cycle stage may include multiple cycle times. For example, the first cycle stage includes $m_1$ cycle times, wherein $m_1$ is an integer and $m_1 \geq 1$. Each cycle may be expressed as one charging and discharging cycle. One charging and discharging cycle includes a charging stage and a discharging stage. In one charging and discharging cycle of the first cycle stage, the electrochemical device 13 may be charged by adopting the charging stage with the first cut-off voltage.

In one embodiment, the charging stage with the first cut-off voltage is preferably charged to the first cut-off voltage by adopting a constant current.

Step S22: in a second cycle stage, the charging stage of the second cycle stage has a second cut-off voltage, wherein the second cut-off voltage is less than the first cut-off voltage.

In one embodiment, the second cycle stage may also include multiple cycle times. For example, the second cycle stage includes $m_2$ cycle times, wherein $m_2$ is an integer and $m_2 \geq 1$. In one charging and discharging cycle of the second cycle stage, the electrochemical device 13 may be charged by adopting the charging stage with the second cut-off voltage.

In one embodiment, the charging stage with the second cut-off voltage is preferably charged to the second cut-off voltage by adopting the constant current.

In one embodiment, the second cut-off voltage is less than the first cut-off voltage. That is, compared with the current charging and discharging cycle stage, when the electrochemical device 13 is charged in another charging and discharging cycle stage, the cut-off voltage of the constant-current charging stage is reduced.

In one embodiment, $m_1$ and $m_2$ may be equal or unequal, and $m_1$ and $m_2$ are preferably 10 to 500.

For example, the charging method for an electrochemical device includes two cycle stages (the first cycle stage and the second cycle stage). The first cycle stage includes 100 charging and discharging cycles, and the second cycle stage includes 50 charging and discharging cycles.

In the first cycle stage:

Step 1: the electrochemical device is charged by using the constant current (for example, 1.5 C) until the voltage of the electrochemical device reaches the first cut-off voltage;

Step 2: the electrochemical device is charged by using the constant voltage (for example, the voltage is equal to the first cut-off voltage) until the current of the electrochemical device reaches a preset charging cut-off current;

Step 3: the electrochemical device is enabled to stand for preset time (for example, 5 minutes);

Step 4: the electrochemical device is discharged to a preset discharging cut-off voltage by using a preset discharging current; and Step 5: the above steps 1 to 4 are repeated for 100 times, that is, the electrochemical device is subjected to 100 charging and discharging cycles.

In the second cycle stage:

Step 1: the electrochemical device is charged by using the constant current (for example, 1.5 C) until the voltage of the electrochemical device reaches the second cut-off voltage;

Step 2: the electrochemical device is charged by using the constant voltage (for example, the voltage is equal to the second cut-off voltage) until the current of the electrochemical device reaches the preset cut-off current;

Step 3: the electrochemical device is enabled to stand for preset time (for example, 5 minutes);

Step 4: the electrochemical device is discharged to the preset discharging cut-off voltage by using the preset discharging current; and Step 5: the above steps 1 to 4 are repeated for 50 times, that is, the electrochemical device is subjected to 50 charging and discharging cycles. It should be noted that the sizes of the preset discharging current and the preset discharging cut-off voltage during the discharging can be set and adjusted according to actual usage requirements, which belongs to the prior art and will not be described in detail here.

Figure 3:
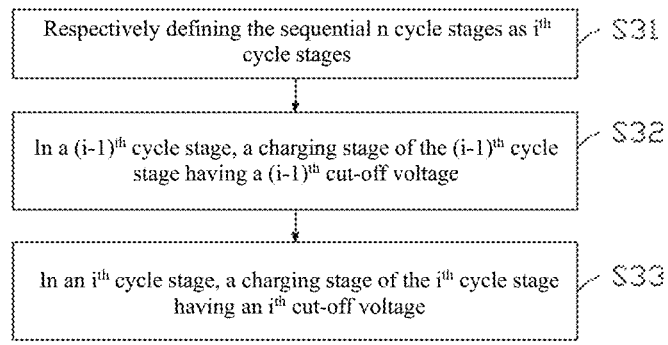
FIG. 3 is a flowchart of a charging method for an electrochemical device according to another embodiment of the present application.

In one embodiment, please refer to FIG. 3, in a plurality of charging and discharging cycle stages, the electrochemical device 13 is charged by using sequential n cycle stages, wherein n is a positive integer, which can be specifically performed through the following steps:

Step S31: the sequential n cycle stages are respectively defined as $i^{th}$ cycle stages.

In one embodiment, the sequential n cycle stages may be respectively defined as the $i^{th}$ cycle stages, wherein i=1, 2, . . . , n.

Step S32: in the $(i-1)^{th}$ cycle stage, the charging stage of the $(i-1)^{th}$ cycle stage has a $(i-1)^{th}$ cut-off voltage.

In one embodiment, the previous cycle stage of the $i^{th}$ cycle stage is defined as the $(i-1)^{th}$ cycle stage. In the $(i-1)^{th}$ cycle stage, the electrochemical device 13 may be charged by adopting charging stages with the $(i-1)^{th}$ cut-off voltage, wherein, is an integer and Step S33: in the $i^{th}$ cycle stage, the charging stage of the $i^{th}$ cycle stage has an $i^{th}$ cut-off voltage.

In one embodiment, in the $i^{th}$ cycle stage, the electrochemical device 13 may be charged by adopting $m_i$ charging stages with the $i^{th}$ cut-off voltage, wherein, $m_i$ is an integer and $m_i \geq 1$.

For example, when i=1 and $m_i$=100, it means that the first cycle stage has 100 charging and discharging cycles, each charging and discharging cycle includes a constant-current charging stage, and the constant-current charging stage of each charging and discharging cycle corresponds to the charging stage with a first cut-off voltage. That is, in the first cycle stage, the electrochemical device 13 is charged to the first cut-off voltage by the constant-current charging stages in the 100 charging and discharging cycles. When i=2 and $m_2$=200, it means that the second cycle stage has 200 charging and discharging cycles, each charging and discharging cycle includes a constant-current charging stage, and the constant-current charging stage of each charging and discharging cycle corresponds to the charging stage with a second cut-off voltage. That is, in the second cycle stage, the electrochemical device 13 is charged to the second cut-off voltage by the constant-current charging stages in the 200 charging and discharging cycles. When i=3 and $m_3$=100, it means that the third cycle stage has 100 charging and discharging cycles, each charging and discharging cycle includes a constant-current charging stage, and the constant-current charging stage of each charging and discharging cycle corresponds to the charging stage with a third cut-off voltage. That is, in the third cycle stage, the electrochemical device 13 is charged to the third cut-off voltage by the constant-current charging stages in the 100 charging and discharging cycles. The third cut-off voltage is less than the second cut-off voltage, and the second cut-off voltage is less than the first cut-off voltage.

In one embodiment, the cut-off voltage of the constant-current charging stage of the $i^{th}$ cycle stage is defined as the $i^{th}$ cut-off voltage, and the cut-off voltage of the constant-current charging stage of the $(i-1)^{th}$ cycle stage is defined as the $(i-1)^{th}$ cut-off voltage. The $i^{th}$ cut-off voltage is 3.8V to 4.3V, preferably 4.0V to 4.3V. The value of $m_i$ is preferably 10 to 500.

In one embodiment, the $i^{th}$ cut-off voltage may be set and adjusted according to actual usage requirements. For example, the $i^{th}$ cut-off voltage may be 4.2V, 4.18V, 4.15V, or may also be other values.

Figure 4:
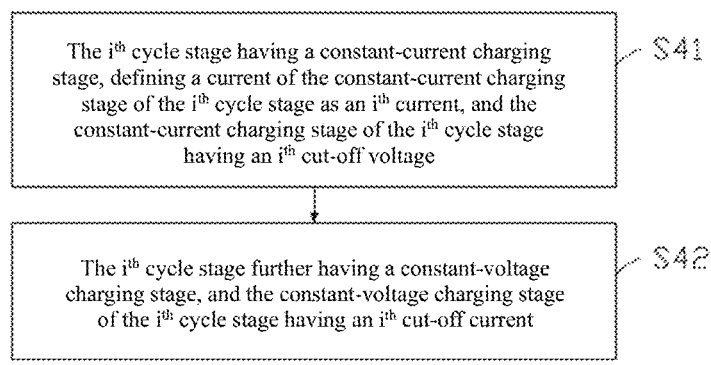
FIG. 4 is a detailed flowchart of the charging method for an electrochemical device of FIG. 3 in an $i^{th}$ cycle stage.

Please refer to FIG. 4, in the $i^{th}$ cycle stage, the charging stage of the $i^{th}$ cycle stage has the $i^{th}$ cut-off voltage, which may include the following specific steps:

Step S41: the $i^{th}$ cycle stage has the constant-current charging stage, the current of the constant-current charging stage of the $i^{th}$ cycle stage is defined as an $i^{th}$ current, and the constant-current charging stage of the $i^{th}$ cycle stage has the $i^{th}$ cut-off voltage.

In one embodiment, the $i^{th}$ cycle stage may include $m_i$ charging and discharging cycles, the charging stage of each charging and discharging cycle has the constant-current charging stage, and the current of the constant-current charging stage of the $i^{th}$ cycle stage is defined as the $i^{th}$ current. That is, in one charging and discharging cycle of the $i^{th}$ cycle stage, the electrochemical device 13 is charged to the $i^{th}$ cut-off voltage by the constant-current charging stage of the $i^{th}$ current. The $i^{th}$ cut-off voltage may be a charging limit voltage of the electrochemical device 13. In a preferred embodiment, the $i^{th}$ cut-off voltage may be 4.2V or may also be other values. The $i^{th}$ current may be set according to actual requirements. For example, the $i^{th}$ current may be 1.5 C or may also be other values.

Step S42: the $i^{th}$ cycle stage further has a constant-voltage charging stage, and the constant-voltage charging stage of the $i^{th}$ cycle stage has an $i^{th}$ cut-off current.

In one embodiment, in the charging stage of one charging and discharging cycle of the $i^{th}$ cycle stage, the electrochemical device 13 is firstly charged to the $i^{th}$ cut-off voltage by the constant-current charging stage with the $i^{th}$ current, and then the electrochemical device 13 is charged to the $i^{th}$ cut-off current by the constant-voltage charging stage with the $i^{th}$ voltage. For example, when $m_i$=100, that is, the $i^{th}$ cycle stage includes 100 charging and discharging cycles, the charging stage of each charging and discharging cycle may be expressed as: firstly, the electrochemical device 13 is charged to the $i^{th}$ cut-off voltage by the constant-current charging stage with the $i^{th}$ current, and then the electrochemical device 13 is charged to the $i^{th}$ cut-off current by the constant-voltage charging stage with the $i^{th}$ voltage.

In one embodiment, in the $i^{th}$ cycle stage, the $i^{th}$ voltage is equal to the $i^{th}$ cut-off voltage. The $i^{th}$ cut-off current is preferably 0.5 C to 6 C, and may also be other values.

Figure 5:
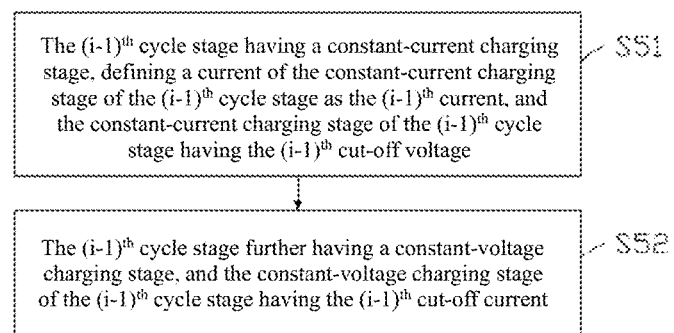
FIG. 5 is a detailed flowchart of the charging method for an electrochemical device of FIG. 3 in a $(i-1)^{th}$ cycle stage.

Please refer to FIG. 5, in the $(i-1)^{th}$ $(i-1 \geq 1)$ cycle stage, the charging stage of the $(i-1)^{th}$ cycle stage has the $(i-1)^{th}$ cut-off voltage, which may include the following specific steps:

Step S51: the $(i-1)^{th}$ cycle stage has the constant-current charging stage, the current of the constant-current charging stage of the $(i-1)^{th}$ cycle stage is defined as the $(i-1)^{th}$ current, and the constant-current charging stage of the $(i-1)^{th}$ cycle stage has the $(i-1)^{th}$ cut-off voltage.

In one embodiment, the $(i-1)^{th}$ cycle stage may include $m_{i-1}$ charging and discharging cycles, the charging stage of each charging and discharging cycle has the constant-current charging stage, and the current of the constant-current charging stage of the $(i-1)^{th}$ cycle stage is defined as the $(i-1)^{th}$ current. That is, in one charging and discharging cycle of the $(i-1)^{th}$ cycle stage, the electrochemical device 13 is charged to the $(i-1)^{th}$ cut-off voltage by the constant-current charging stage with the $(i-1)^{th}$ current. The $(i-1)^{th}$ cut-off voltage may also be the charging limit voltage of the electrochemical device 13. In a preferred embodiment, the $(i-1)^{th}$ cut-off voltage is preferably 4.2V, or may also be other values. The $(i-1)^{th}$ current may be 1.5 C or may also be other values.

Step S52: the $(i-1)^{th}$ cycle stage also has the constant-voltage charging stage, and the constant-voltage charging stage of the $(i-1)^{th}$ cycle stage has the $(i-1)^{th}$ cut-off current.

In one embodiment, in the charging stage of one charging and discharging cycle of the $(i-1)^{th}$ cycle stage, the electrochemical device 13 is firstly charged to the $(i-1)^{th}$ cut-off voltage by the constant-current charging stage with the $(i-1)^{th}$ current. Then the electrochemical device 13 is charged to the $(i-1)^{th}$ cut-off current by the constant-voltage charging stage with the $(i-1)^{th}$ voltage. For example, when $m_{i-1}$=200, that is, the $(i-1)^{th}$ cycle stage includes 200 charging and discharging cycles. The charging stage of each charging and discharging cycle may be expressed as: the electrochemical device 13 is charged to the $(i-1)^{th}$ cut-off voltage by the constant-current charging stage with the $(i-1)^{th}$ current, and then the electrochemical device 13 is charged to the $(i-1)^{th}$ cut-off current by the constant-voltage charging stage with the $(i-1)^{th}$ voltage.

In one embodiment, the $i^{th}$ current is equal to the $(i-1)^{th}$ current. That is, in the $(i-1)^{th}$ cycle stage and the $i^{th}$ cycle stage, the electrochemical device 13 is subjected to constant-current charging with the constant current of the same size. However, the $(i-1)^{th}$ cycle stage is charged to the $(i-1)^{th}$ cut-off voltage, and the $i^{th}$ cycle stage is charged to the $i^{th}$ cut-off voltage.

In one embodiment, the $i^{th}$ cut-off current is equal to the $(i-1)^{th}$ cut-off current. That is, the $(i-1)^{th}$ cycle stage and the $i^{th}$ cycle stage both include charging the electrochemical device 13 to the cut-off current of the same size with the constant voltage. However, the $(i-1)^{th}$ cycle stage performs constant-voltage charging with the $(i-1)^{th}$ voltage, and the $i^{th}$ cycle stage performs constant-voltage charging with the $i^{th}$ voltage.

In other embodiments, the $i^{th}$ cut-off current may also be greater than the $(i-1)^{th}$ cut-off current. For example, the $i^{th}$ cut-off current is 1C, and the $(i-1)^{th}$ cut-off current is 0.5C. The $(i-1)^{th}$ cycle stage includes performing constant-voltage charging on the electrochemical device 13 to the cut-off current 0.5C with the $(i-1)^{th}$ voltage, and the $i^{th}$ cycle stage includes performing constant-voltage charging on the electrochemical device 13 to the cut-off current of 1C with the $i^{th}$ voltage.

In order to clarify the objectives, technical solutions, and technical effects of the present application, the following describes the present application in further detail in conjunction with the accompanying drawings and embodiments.

Figure 6:
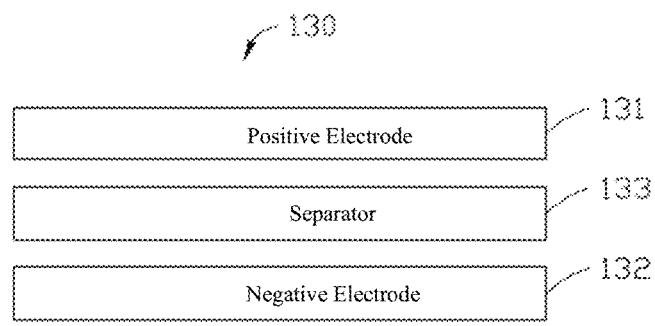
FIG. 6 is a schematic structural diagram of an electrochemical device according to an embodiment of the present application.

Please refer to FIG. 6, the electrochemical device 13 adopted in each comparative example and each embodiment of the present application includes an electrode assembly 130. The electrode assembly 130 includes a positive electrode 131, a negative electrode 132, and a separator 133. The separator 133 is disposed between the positive electrode 131 and the negative electrode 132. At least one of the positive electrode 131 and the negative electrode 132 has two or more tabs (not shown in FIG. 6).

In one embodiment, the electrode assembly 130 has a wound structure. At least one of the positive electrode 131 and the negative electrode 132 has a tab every two circles.

In one embodiment, the positive electrode 131 includes a positive electrode active material. The positive electrode active material is at least one of the compounds represented by the chemical formula $Li_\alpha Ni_x Co_y M1_z M2_\beta O_2$, wherein $0.95 \leq \alpha \leq 1.05$, $0.6 \leq x<1$, $0<y<0.4$, $0<z<0.4$, $0 \leq \beta \leq 0.05$, and $x+y+z+\beta=1$, M1 is at least one element selected from the group consisting of Mn and Al, and M2 is at least one element selected from the group consisting of Mg, Ti, Zr, Nb, Y, Cr, V, Ge, Mo and Sr. The negative electrode 132 includes at least one of silicon, tin, a silicon carbon material, artificial graphite, natural graphite, mesophase carbon microspheres, soft carbon, hard carbon, lithium titanate, or niobium titanate. In other embodiments, the positive electrode active material may also be at least one of lithium cobaltate, lithium iron phosphate, lithium iron manganese phosphate, lithium manganate, and lithium-rich manganese-based materials.

In one embodiment, the positive active material has at least one of the following characteristics:
(A) including secondary particles;
(B) $Dv10 \geq 5.0$ μm;
(C) $7.5$ μm $< Dv50 < 12.5$ μm;
(D) $Dv90 \leq 22.0$ μm;
wherein the Dv10 represents the particle size reaching 10% of a volume accumulation from a small particle size side in a volume-based particle size distribution; Dv50 represents the particle size reaching 50% of the volume accumulation from the small particle size side in the volume-based particle size distribution; and Dv90 represents the particle size reaching 90% of the volume accumulation from the small particle size side in the volume-based particle size distribution.

Figure 7:
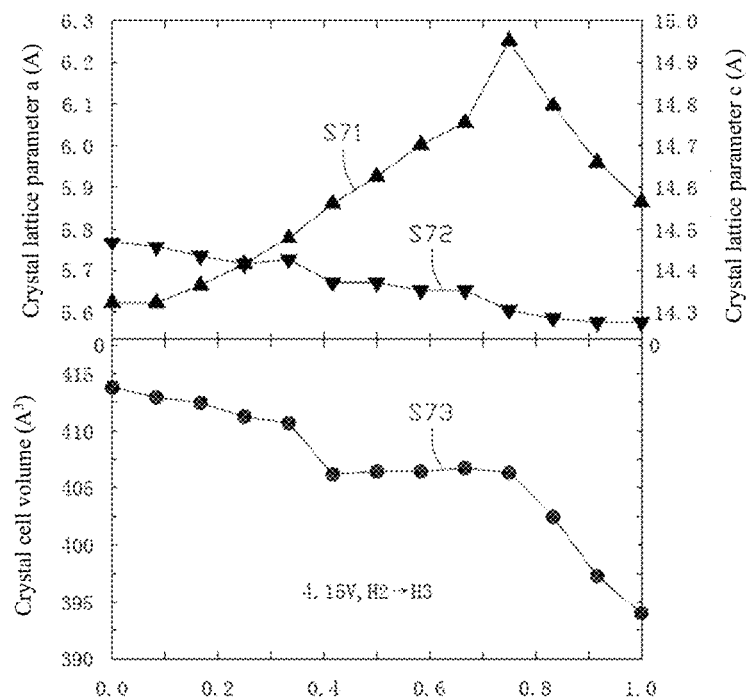
FIG. 7 is a change curve graph of crystal lattice parameters of $LiNi_{0.8}Co_{0.1}Mn_{0.1}O_2$ as the positive electrode active material of an electrochemical device according to an embodiment of the present application.
Figure 8:
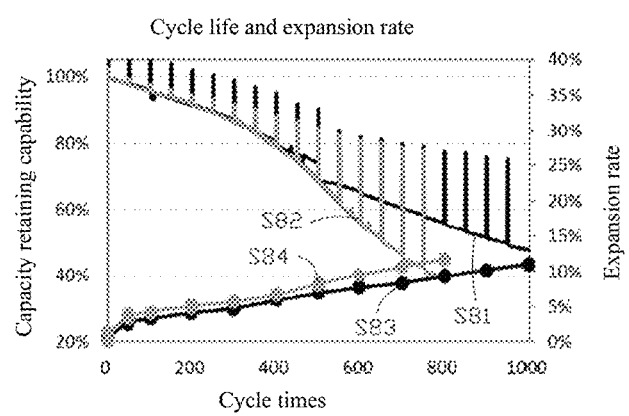
FIG. 8 is a comparison diagram of a cycle life and an expansion rate of an electrochemical device in a constant constant-current cut-off voltage cycle and a reduced constant-current cut-off voltage cycle according to an embodiment of the present application.

In one embodiment, the positive electrode active material is a lithium battery with the chemical formula $Li_\alpha Ni_x Co_y M1_z M2_\beta O_2$. Due to poor high-temperature stability, as shown in FIG. 7, when the lithium battery with a $LiNi_{0.8}Co_{0.1}Mn_{0.1}O_2$ high-nickel system is charged and discharged at an upper limit voltage greater than 4.0V, the H2↔H3 phase transformation is accompanied by violent expansion/shrinkage of crystal lattices. The stress generated by the expansion/shrinkage of the crystal lattices during repeated charging and discharging is continuously accumulated, resulting in oxygen release from the crystal lattices and particle rupture. The place of the rupture is generally accompanied by the transformation of a layered phase into spinel and rock salt phases, so as to generate active oxygen. Finally, an electrolyte contacts the active oxygen released from the positive electrode active material at the place where the particles are ruptured, and generates gas through side reactions. Relatively speaking, the strategy of this solution is to gradually reduce a true charging upper limit voltage during the charging stage of each cycle stage before the particles are ruptured, and gradually slow down the stress accumulation of the positive electrode active material due to the H2↔H3 phase transformation accompanied by the violent expansion/shrinkage of the crystal lattices, thereby effectively preventing the oxygen release, particle rupture, and gas generation. As shown in FIG. 8, by reducing the constant-current charging cut-off voltage, that is, by reducing a charging and discharging window of the lithium battery, the expansion of the lithium battery due to gas generation can be effectively alleviated, and a capacity decay trend of the lithium battery during the cycle can also be effectively alleviated. Therefore, the reasonably designed strategy of gradient reduction of the constant-current charging cut-off voltage can effectively solve the problem of cyclic gas generation without affecting the user experience.

It should be noted that in FIG. 7, S71 represents the change curve of a crystal lattice parameter c, S72 represents the change curve of a crystal lattice parameter a, and S73 represents the change curve of a crystal cell. In FIG. 8, S81 is the change curve of a cycle life of the constant-current charging cut-off voltage during a reduction cycle, S82 is the change curve of the cycle life of the constant-current charging cut-off voltage during a constant cycle, S83 is the change curve of an expansion rate of the constant-current charging cut-off voltage during the reduction cycle, and S84 is the change curve of the expansion rate of the constant-current charging cut-off voltage during the constant cycle.

It should be noted that the electrochemical device of each comparative example and each embodiment of the present application uses the lithium-ion battery as an example for illustration, and the charging limit voltage of the electrochemical device of each comparative example and each embodiment of the present application uses 4.1V to 4.3V as an example. It is explained herein that the charging method of the present application may also be applied to the electrochemical devices of other voltage systems, and is not limited to the 4.1V to 4.3V system. The electrochemical device after the system is used is subjected to cycle performance testing by adopting the comparative examples of a charging method in the prior art (constant-current charging and constant-voltage charging) and the embodiments of the charging method of the present application to compare the expansion rate of the lithium battery.

In Comparative Example 1 described below, the electrochemical device 13 is charged by adopting the charging method in the prior art.

COMPARATIVE EXAMPLE 1

It should be noted that Comparative Example 1 discloses a specific implementation process of adopting the formed electrochemical device 13 to execute the charging method of the prior art (that is, the constant-current charging stage is cut-off at a fixed voltage).

Ambient temperature: 25° C.; ethylene carbonate/dimethyl carbonate content in the electrolyte: 20 wt %; positive electrode active material: $LiNi_{0.8}Co_{0.1}Mn_{0.1}O_2$; particle type: secondary particles; Dv50/μm of the positive electrode active material: 8.5; electrode assembly structure: wound full tab structure (one tab for each layer of positive electrode piece);

The charging and discharging process of the first cycle stage:
Step 1: the electrochemical device 13 is charged by using the constant current of 1.5 C until the voltage of the electrochemical device reaches the cut-off voltage of 4.2V;
Step 2: the electrochemical device 13 is charged by using the constant voltage of 4.2V until the current of the electrochemical device reaches a preset cut-off current (0.05 C);
Step 3: the electrochemical device 13 is discharged to a preset discharging cut-off voltage by using a preset discharging current;
Step 4: the above steps 1 to 3 are repeated for 300 times, that is, the electrochemical device 13 is subjected to 300 charging and discharging cycles.

The charging and discharging process of the second cycle stage:
Step 1: the electrochemical device 13 is charged by using the constant current of 1.5 C until the voltage of the electrochemical device reaches the cut-off voltage of 4.2V;
Step 2: the electrochemical device 13 is charged by using the constant voltage of 4.2V until the current of the electrochemical device reaches the preset cut-off current (0.05 C);
Step 3: the electrochemical device 13 is discharged to the preset discharging cut-off voltage by using the preset discharging current;
Step 4: the above steps 1 to 3 are repeated for 100 times, that is, the electrochemical device 13 is subjected to 100 charging and discharging cycles.

The charging and discharging process of the third cycle stage:
- Step 1: the electrochemical device 13 is charged by using the constant current of 1.5 C until the voltage of the electrochemical device reaches the cut-off voltage of 4.2V;
- Step 2: the electrochemical device 13 is charged by using the constant voltage of 4.2V until the current of the electrochemical device reaches the preset cut-off current (0.05 C);
- Step 3: the electrochemical device 13 is discharged to the preset discharging cut-off voltage by using the preset discharging current;
- Step 4: the above steps 1 to 3 are repeated for 100 times, that is, the electrochemical device 13 is subjected to 100 charging and discharging cycles.

The charging and discharging process of the fourth cycle stage:
- Step 1: the electrochemical device 13 is charged by using the constant current of 1.5 C until the voltage of the electrochemical device reaches the cut-off voltage of 4.2V;
- Step 2: the electrochemical device 13 is charged by using the constant voltage of 4.2V until the current of the electrochemical device reaches the preset cut-off current (0.05 C);
- Step 3: the electrochemical device 13 is discharged to the preset discharging cut-off voltage by using the preset discharging current;
- Step 4: the above steps 1 to 3 are repeated for 100 times, that is, the electrochemical device 13 is subjected to 100 charging and discharging cycles.

The charging and discharging process of the fifth cycle stage:
- Step 1: the electrochemical device 13 is charged by using the constant current of 1.5 C until the voltage of the electrochemical device reaches the cut-off voltage of 4.2V;
- Step 2: the electrochemical device 13 is charged by using the constant voltage of 4.2V until the current of the electrochemical device reaches the preset cut-off current (0.05 C);
- Step 3: the electrochemical device 13 is discharged to the preset discharging cut-off voltage by using the preset discharging current;
- Step 4: the above steps 1 to 3 are repeated for 100 times, that is, the electrochemical device 13 is subjected to 100 charging and discharging cycles.

After the electrochemical device 13 passes five cycles, the expansion rate of the electrochemical device is measured to be 30%. The five cycle stages include a total of 700 charging and discharging cycles, that is, the expansion rate of the electrochemical device after 700 cycles is 30%.

In the specific Embodiments 1 to 32 described below, the electrochemical device 13 is charged by adopting the charging method in the embodiments of the present application. It should be noted that specific Embodiments 1 to 32 disclose the use of formed electrochemical device to obtain the corresponding charging parameters, and the ambient temperature during the charging is the same as that of Comparative Example 1 and remains unchanged. The formed electrochemical device refers to an electrochemical device that has not been used before leaving the factory, or an electrochemical device of which the times of charging and discharging cycles after leaving the factory is less than preset times (for example, 10 times, or other times).

Embodiment 1

Ambient temperature: 25° C.; ethylene carbonate/dimethyl carbonate content in the electrolyte: 20 wt %; positive electrode active material: $LiNi_{0.8}Co_{0.1}Mn_{0.1}O_2$; particle type: secondary particles; Dv50/μm of the positive electrode active material: 8.5; electrode assembly structure: wound full tab structure (one tab for each layer of positive electrode piece);

The charging and discharging process of the first cycle stage:
- Step 1: the electrochemical device 13 is charged by using the constant current of 1.5 C until the voltage of the electrochemical device reaches the cut-off voltage of 4.2V;
- Step 2: the electrochemical device 13 is charged by using the constant voltage of 4.2V until the current of the electrochemical device reaches the preset cut-off current (0.05 C);
- Step 3: the electrochemical device 13 is discharged to the preset discharging cut-off voltage by using the preset discharging current;
- Step 4: the above steps 1 to 3 are repeated for 300 times, that is, the electrochemical device 13 is subjected to 300 charging and discharging cycles.

The charging and discharging process of the second cycle stage:
- Step 1: the electrochemical device 13 is charged by using the constant current of 1.5 C until the voltage of the electrochemical device reaches the cut-off voltage of 4.18V;
- Step 2: the electrochemical device 13 is charged by using the constant voltage of 4.18V until the current of the electrochemical device reaches the preset cut-off current (0.05 C);
- Step 3: the electrochemical device 13 is discharged to the preset discharging cut-off voltage by using the preset discharging current;
- Step 4: the above steps 1 to 3 are repeated for 100 times, that is, the electrochemical device 13 is subjected to 100 charging and discharging cycles.

The charging and discharging process of the third cycle stage:
- Step 1: the electrochemical device 13 is charged by using the constant current of 1.5 C until the voltage of the electrochemical device reaches the cut-off voltage of 4.15V;
- Step 2: the electrochemical device 13 is charged by using the constant voltage of 4.15V until the current of the electrochemical device reaches the preset cut-off current (0.05 C);
- Step 3: the electrochemical device 13 is discharged to the preset discharging cut-off voltage by using the preset discharging current;
- Step 4: the above steps 1 to 3 are repeated for 100 times, that is, the electrochemical device 13 is subjected to 100 charging and discharging cycles.

The charging and discharging process of the fourth cycle stage:
- Step 1: the electrochemical device 13 is charged by using the constant current of 1.5 C until the voltage of the electrochemical device reaches the cut-off voltage of 4.1V;

Step 2: the electrochemical device 13 is charged by using the constant voltage of 4.1V until the current of the electrochemical device reaches the preset cut-off current (0.05 C);

Step 3: the electrochemical device 13 is discharged to the preset discharging cut-off voltage by using the preset discharging current;

Step 4: the above steps 1 to 3 are repeated for 100 times, that is, the electrochemical device 13 is subjected to 100 charging and discharging cycles.

The charging and discharging process of the fifth cycle stage:

Step 1: the electrochemical device 13 is charged by using the constant current of 1.5 C until the voltage of the electrochemical device reaches the cut-off voltage of 4V;

Step 2: the electrochemical device 13 is charged by using the constant voltage of 4V until the current of the electrochemical device reaches the preset cut-off current (0.05 C);

Step 3: the electrochemical device 13 is discharged to the preset discharging cut-off voltage by using the preset discharging current;

Step 4: the above steps 1 to 3 are repeated for 100 times, that is, the electrochemical device 13 is subjected to 100 charging and discharging cycles.

After the electrochemical device 13 passes five cycles, the expansion rate of the electrochemical device is measured to be 10%. The five cycle stages include a total of 700 charging and discharging cycles, that is, the expansion rate of the electrochemical device after 700 cycles of Embodiment 1 is 10%.

Embodiment 2

Ambient temperature: 25° C.; ethylene carbonate/dimethyl carbonate content in the electrolyte: 20 wt %; positive electrode active material: $LiNi_{0.8}Co_{0.1}Mn_{0.1}O_2$; particle type: secondary particles; Dv50/μm of the positive electrode active material: 8.5; electrode assembly structure: wound full tab structure (one tab for each layer of positive electrode piece);

The charging and discharging process of the first cycle stage:

Step 1: the electrochemical device 13 is charged by using the constant current of 1.5 C until the voltage of the electrochemical device reaches the cut-off voltage of 4.2V;

Step 2: the electrochemical device 13 is charged by using the constant voltage of 4.2V until the current of the electrochemical device reaches the preset cut-off current (0.05 C);

Step 3: the electrochemical device 13 is discharged to the preset discharging cut-off voltage by using the preset discharging current;

Step 4: the above steps 1 to 3 are repeated for 300 times, that is, the electrochemical device 13 is subjected to 300 charging and discharging cycles.

The charging and discharging process of the second cycle stage:

Step 1: the electrochemical device 13 is charged by using the constant current of 1.5 C until the voltage of the electrochemical device reaches the cut-off voltage of 4.15V;

Step 2: the electrochemical device 13 is charged by using the constant voltage of 4.15V until the current of the electrochemical device reaches the preset cut-off current (0.05 C);

Step 3: the electrochemical device 13 is discharged to the preset discharging cut-off voltage by using the preset discharging current;

Step 4: the above steps 1 to 3 are repeated for 100 times, that is, the electrochemical device 13 is subjected to 100 charging and discharging cycles.

The charging and discharging process of the third cycle stage:

Step 1: the electrochemical device 13 is charged by using the constant current of 1.5 C until the voltage of the electrochemical device reaches the cut-off voltage 4.1V;

Step 2: the electrochemical device 13 is charged by using the constant voltage of 4.1V until the current of the electrochemical device reaches the preset cut-off current (0.05 C);

Step 3: the electrochemical device 13 is discharged to the preset discharging cut-off voltage by using the preset discharging current;

Step 4: the above steps 1 to 3 are repeated for 100 times, that is, the electrochemical device 13 is subjected to 100 charging and discharging cycles.

The charging and discharging process of the fourth cycle stage:

Step 1: the electrochemical device 13 is charged by using the constant current of 1.5 C until the voltage of the electrochemical device reaches the cut-off voltage of 4.05V;

Step 2: the electrochemical device 13 is charged by using the constant voltage of 4.05V until the current of the electrochemical device reaches the preset cut-off current (0.05 C);

Step 3: the electrochemical device 13 is discharged to the preset discharging cut-off voltage by using the preset discharging current;

Step 4: the above steps 1 to 3 are repeated for 100 times, that is, the electrochemical device 13 is subjected to 100 charging and discharging cycles.

The charging and discharging process of the fifth cycle stage:

Step 1: the electrochemical device 13 is charged by using the constant current of 1.5 C until the voltage of the electrochemical device reaches the cut-off voltage of 4V;

Step 2: the electrochemical device 13 is charged by using the constant voltage of 4V until the current of the electrochemical device reaches the preset cut-off current (0.05 C);

Step 3: the electrochemical device 13 is discharged to the preset discharging cut-off voltage by using the preset discharging current;

Step 4: the above steps 1 to 3 are repeated for 100 times, that is, the electrochemical device 13 is subjected to 100 charging and discharging cycles.

After the electrochemical device 13 passes five cycles, the expansion rate of the electrochemical device is measured to be 8%. The five cycle stages include a total of 700 charging and discharging cycles, that is, the expansion rate of the electrochemical device after 700 cycles of Embodiment 2 is 8%.

As shown in Tables 1-2 below, the charging parameters and the expansion rate of the electrochemical device in comparison between Embodiments 1-17 and Comparative Example 1 are summarized.

TABLE 1

| Embodiments | Constant-charging current/C | Cut-off voltage/V of first cycle stage | Times of first cycle stage | Cut-off voltage/V of second cycle stage | Times of second cycle stage | Cut-off voltage/V of third cycle stage | Times of third cycle stage | Cut-off voltage/V of fourth cycle stage | Times of fourth cycle stage | Cut-off voltage/V of fifth cycle stage | Times of fifth cycle stage |
|---|---|---|---|---|---|---|---|---|---|---|---|
| 1 | 1.5 | 4.2 | 300 | 4.18 | 100 | 4.15 | 100 | 4.1 | 100 | 4 | 100 |
| 2 | 1.5 | 4.2 | 300 | 4.15 | 100 | 4.1 | 100 | 4.05 | 100 | 4 | 100 |
| 3 | 1.5 | 4.2 | 200 | 4.18 | 100 | 4.15 | 200 | 4.1 | 100 | 4 | 100 |
| 4 | 1.5 | 4.2 | 300 | 4.18 | 100 | 4.15 | 200 | 4.1 | 100 | / | / |
| 5 | 1 | 4.2 | 300 | 4.18 | 100 | 4.15 | 100 | 4.1 | 100 | 4 | 100 |
| 6 | 2 | 4.2 | 300 | 4.18 | 100 | 4.15 | 100 | 4.1 | 100 | 4 | 100 |
| 7 | 2.5 | 4.2 | 300 | 4.18 | 100 | 4.15 | 100 | 4.1 | 100 | 4 | 100 |
| 8 | 3 | 4.2 | 200 | 4.18 | 100 | 4.15 | 100 | 4.1 | 100 | 4 | 150 |
| 9 | 1.5 | 4.1 | 300 | 4.07 | 100 | 4.05 | 100 | 4.02 | 100 | 4 | 100 |
| 10 | 1.5 | 4.15 | 300 | 4.12 | 100 | 4.09 | 100 | 4.04 | 100 | 4 | 100 |
| 11 | 1.5 | 4.18 | 300 | 4.15 | 100 | 4.1 | 100 | 4.06 | 100 | 4 | 100 |
| 12 | 1.5 | 4.25 | 300 | 4.2 | 100 | 4.15 | 100 | 4.07 | 100 | 4 | 100 |
| 13 | 1.5 | 4.3 | 300 | 4.2 | 100 | 4.15 | 100 | 4.1 | 100 | 4 | 100 |
| 14 | 1.5 | 4.2 | 400 | 4.18 | 100 | 4.15 | 100 | 4.1 | 100 | 4 | 100 |
| 15 | 1.5 | 4.2 | 350 | 4.18 | 100 | 4.15 | 100 | 4.1 | 100 | 4 | 100 |
| 16 | 1.5 | 4.2 | 250 | 4.18 | 100 | 4.15 | 100 | 4.1 | 100 | 4 | 100 |
| 17 | 1.5 | 4.2 | 200 | 4.18 | 100 | 4.15 | 100 | 4.1 | 100 | 4 | 100 |

| Comparative example | Constant-charging current/C | Cut-off voltage/V of first cycle stage | Times of first cycle stage | Cut-off voltage/V of second cycle stage | Times of second cycle stage | Cut-off voltage/V of third cycle stage | Times of third cycle stage | Cut-off voltage/V of fourth cycle stage | Times of fourth cycle stage | Cut-off voltage/V of fifth cycle stage | Times of fifth cycle stage |
|---|---|---|---|---|---|---|---|---|---|---|---|
| 1 | 1.5 | 4.2 | 300 | 4.2 | 100 | 4.2 | 100 | 4.2 | 100 | 4.2 | 100 |

TABLE 2

| Embodiments | Ethylene carbonate/ dimethyl carbonate content in electrolyte | Positive electrode active material | Particle type | Dv50/μm of the positive electrode active material | Electrode assembly structure | Expansion rate of the electrochemical device after 700 cycles |
|---|---|---|---|---|---|---|
| 1 | 20 wt % | $LiNi_{0.8}Co_{0.1}Mn_{0.1}O_2$ | Secondary particles | 8.5 | Full tab structure (one tab for each layer of positive electrode piece) | 10.0% |
| 2 | 20 wt % | $LiNi_{0.8}Co_{0.1}Mn_{0.1}O_2$ | Secondary particles | 8.5 | Full tab structure (one tab for each layer of positive electrode piece) | 8.0% |
| 3 | 20 wt % | $LiNi_{0.8}Co_{0.1}Mn_{0.1}O_2$ | Secondary particles | 8.5 | Full tab structure (one tab for each layer of positive electrode piece) | 9.0% |
| 4 | 20 wt % | $LiNi_{0.8}Co_{0.1}Mn_{0.1}O_2$ | Secondary particles | 8.5 | Full tab structure (one tab for each layer of positive electrode piece) | 11.0% |
| 5 | 20 wt % | $LiNi_{0.8}Co_{0.1}Mn_{0.1}O_2$ | Secondary particles | 8.5 | Full tab structure (one tab for each layer of positive electrode piece) | 9.0% |
| 6 | 20 wt % | $LiNi_{0.8}Co_{0.1}Mn_{0.1}O_2$ | Secondary particles | 8.5 | Full tab structure (one tab for each layer of positive electrode piece) | 10.5% |
| 7 | 20 wt % | $LiNi_{0.8}Co_{0.1}Mn_{0.1}O_2$ | Secondary particles | 8.5 | Full tab structure (one tab for each layer of positive electrode piece) | 11.0% |

TABLE 2-continued

| | | | | | | |
|---|---|---|---|---|---|---|
| 8 | 20 wt % | $LiNi_{0.8}Co_{0.1}Mn_{0.1}O_2$ | Secondary particles | 8.5 | Full tab structure (one tab for each layer of positive electrode piece) | 13.0% |
| 9 | 20 wt % | $LiNi_{0.8}Co_{0.1}Mn_{0.1}O_2$ | Secondary particles | 8.5 | Full tab structure (one tab for each layer of positive electrode piece) | 6.0% |
| 10 | 20 wt % | $LiNi_{0.8}Co_{0.1}Mn_{0.1}O_2$ | Secondary particles | 8.5 | Full tab structure (one tab for each layer of positive electrode piece) | 6.0% |
| 11 | 20 wt % | $LiNi_{0.8}Co_{0.1}Mn_{0.1}O_2$ | Secondary particles | 8.5 | Full tab structure (one tab for each layer of positive electrode piece) | 8.0% |
| 12 | 20 wt % | $LiNi_{0.8}Co_{0.1}Mn_{0.1}O_2$ | Secondary particles | 8.5 | Full tab structure (one tab for each layer of positive electrode piece) | 30.0% |
| 13 | 20 wt % | $LiNi_{0.8}Co_{0.1}Mn_{0.1}O_2$ | Secondary particles | 8.5 | Full tab structure (one tab for each layer of positive electrode piece) | 40.0% |
| 14 | 10 wt % | $LiNi_{0.8}Co_{0.1}Mn_{0.1}O_2$ | Secondary particles | 8.5 | Full tab structure (one tab for each layer of positive electrode piece) | 14.0% |
| 15 | 15 wt % | $LiNi_{0.8}Co_{0.1}Mn_{0.1}O_2$ | Secondary particles | 8.5 | Full tab structure (one tab for each layer of positive electrode piece) | 11.0% |
| 16 | 25 wt % | $LiNi_{0.8}Co_{0.1}Mn_{0.1}O_2$ | Secondary particles | 8.5 | Full tab structure (one tab for each layer of positive electrode piece) | 9.5% |
| 17 | 30 wt % | $LiNi_{0.8}Co_{0.1}Mn_{0.1}O_2$ | Secondary particles | 8.5 | Full tab structure (one tab for each layer of positive electrode piece) | 9.0% |

| Comparative example | Ethylene carbonate/ dimethyl carbonate content in electrolyte | Positive electrode active material | Particle type | Dv50/μm of the positive electrode active material | Electrode assembly structure | Expansion rate of the electrochemical device after 700 cycles |
|---|---|---|---|---|---|---|
| 1 | 20 wt % | $LiNi_{0.8}Co_{0.1}Mn_{0.1}O_2$ | Secondary particles | 8.5 | Full tab structure (one tab for each layer of positive electrode piece) | 30% |

As shown in Tables 1-2 above, Embodiment 3 is basically the same as Embodiment 1, except that in Embodiment 3, the first cycle stage includes 200 charging and discharging cycles, and the third cycle stage includes 200 charging and discharging cycles. The expansion rate of the electrochemical device after 700 cycles of Embodiment 3 is 9%.

Embodiment 4 is basically the same as Embodiment 1, except that in Embodiment 4, the third cycle stage includes 200 charging and discharging cycles, and the fifth cycle stage is omitted. The expansion rate of the electrochemical device after 700 cycles of Embodiment 4 is 11%.

Embodiment 5 is basically the same as Embodiment 1, except that in Embodiment 5, the electrochemical device 13 is charged by using the constant current of 1 C in the charging and discharging cycle of each cycle stage. The expansion rate of the electrochemical device after 700 cycles of Embodiment 5 is 9%.

Embodiment 6 is basically the same as Embodiment 1, except that in Embodiment 6, the electrochemical device 13 is charged by using the constant current of 2 C in the charging and discharging cycle of each cycle stage. The expansion rate of the electrochemical device after 700 cycles of Embodiment 6 is 10.5%.

Embodiment 7 is basically the same as Embodiment 1, except that in Embodiment 7, the electrochemical device 13 is charged by using the constant current of 2.5 C in the charging and discharging cycle of each cycle stage. The expansion rate of the electrochemical device after 700 cycles of Embodiment 7 is 11%.

Embodiment 8 is basically the same as Embodiment 1, except that in Embodiment 8, the electrochemical device 13 is charged by using the constant current of 3 C in the charging and discharging cycle of each cycle stage, the first cycle stage includes 200 charging and discharging cycles, and the fifth cycle stage includes 150 charging and discharging cycles. The expansion rate of the electrochemical device after 650 cycles of Embodiment 8 is 13%.

Embodiment 9 is basically the same as Embodiment 1, except that in Embodiment 9, in the first cycle stage, the electrochemical device 13 is charged by using the constant current of 1.5 C until the voltage of the electrochemical device reaches the cut-off voltage of 4.1V; in the second cycle stage, the electrochemical device 13 is charged by using the constant current of 1.5 C until the voltage of the electrochemical device reaches the cut-off voltage of 4.07V; in the third cycle stage, the electrochemical device 13 is charged by using the constant current of 1.5 C until the voltage of the electrochemical device reaches the cut-off voltage of 4.05V; and in the fourth cycle stage, the electrochemical device 13 is charged by using the constant current of 1.5 C until the voltage of the electrochemical device reaches the cut-off voltage of 4.02V. The expansion rate of the electrochemical device after 700 cycles of Embodiment 9 is 6%.

Embodiment 10 is basically the same as Embodiment 1, except that in Embodiment 10, in the first cycle stage, the electrochemical device 13 is charged by using the constant current of 1.5 C until the voltage of the electrochemical device reaches the cut-off voltage of 4.15V; in the second cycle stage, the electrochemical device 13 is charged by using the constant current of 1.5 C until the voltage of the electrochemical device reaches the cut-off voltage of 4.12V; in the third cycle stage, the electrochemical device 13 is charged by using the constant current of 1.5 C until the voltage of the electrochemical device reaches the cut-off voltage of 4.09V; and in the fourth cycle stage, the electrochemical device 13 is charged by using the constant current of 1.5 C until the voltage of the electrochemical device reaches the cut-off voltage of 4.04V. The expansion rate of the electrochemical device after 700 cycles of Embodiment 10 is 6%.

Embodiment 11 is basically the same as Embodiment 1, except that in Embodiment 11, in the first cycle stage, the electrochemical device 13 is charged by using the constant current of 1.5 C until the voltage of the electrochemical device reaches the cut-off voltage of 4.18V; in the second cycle stage, the electrochemical device 13 is charged by using the constant current of 1.5 C until the voltage of the electrochemical device reaches the cut-off voltage of 4.15V; in the third cycle stage, the electrochemical device 13 is charged by using the constant current of 1.5 C until the voltage of the electrochemical device reaches the cut-off voltage of 4.1V; and in the fourth cycle stage, the electrochemical device 13 is charged by using the constant current of 1.5 C until the voltage of the electrochemical device reaches the cut-off voltage of 4.06V. The expansion rate of the electrochemical device after 700 cycles of Embodiment 11 is 8%.

Embodiment 12 is basically the same as Embodiment 1, except that in Embodiment 12, in the first cycle stage, the electrochemical device 13 is charged by using the constant current of 1.5 C until the voltage of the electrochemical device reaches the cut-off voltage of 4.25V; in the second cycle stage, the electrochemical device 13 is charged by using the constant current of 1.5 C until the voltage of the electrochemical device reaches the cut-off voltage of 4.2V; in the third cycle stage, the electrochemical device 13 is charged by using the constant current of 1.5 C until the voltage of the electrochemical device reaches the cut-off voltage of 4.15V; and in the fourth cycle stage, the electrochemical device 13 is charged by using the constant current of 1.5 C until the voltage of the electrochemical device reaches the cut-off voltage of 4.07V. The expansion rate of the electrochemical device after 700 cycles of Embodiment 12 is 30%.

Embodiment 13 is basically the same as Embodiment 1, except that in Embodiment 13, in the first cycle stage, the electrochemical device 13 is charged by using the constant current of 1.5 C until the voltage of the electrochemical device reaches the cut-off voltage of 4.3V; in the second cycle stage, the electrochemical device 13 is charged by using the constant current of 1.5 C until the voltage of the electrochemical device reaches the cut-off voltage of 4.2V; in the third cycle stage, the electrochemical device 13 is charged by using the constant current of 1.5 C until the voltage of the electrochemical device reaches the cut-off voltage of 4.15V; and in the fourth cycle stage, the electrochemical device 13 is charged by using the constant current of 1.5 C until the voltage of the electrochemical device reaches the cut-off voltage of 4.1V. The expansion rate of the electrochemical device after 700 cycles of Embodiment 13 is 40%.

Embodiment 14 is basically the same as Embodiment 1, except that in Embodiment 14, the first cycle stage includes 400 charging and discharging cycles, and the ethylene carbonate/dimethyl carbonate content in the electrolyte is 10 wt %. The expansion rate of the electrochemical device after 800 cycles of Embodiment 14 is 14%.

Embodiment 15 is basically the same as Embodiment 1, except that in Embodiment 15, the first cycle stage includes 350 charging and discharging cycles, and the ethylene carbonate/dimethyl carbonate content in the electrolyte is 15 wt %. The expansion rate of the electrochemical device after 750 cycles of Embodiment 15 is 11%.

Embodiment 16 is basically the same as Embodiment 1, except that in Embodiment 16, the first cycle stage includes 250 charging and discharging cycles, and the ethylene carbonate/dimethyl carbonate content in the electrolyte is 25 wt %. The expansion rate of the electrochemical device after 650 cycles of Embodiment 16 is 9.5%.

Embodiment 17 is basically the same as Embodiment 1, except that in Embodiment 17, the first cycle stage includes 200 charging and discharging cycles, and the ethylene carbonate/dimethyl carbonate content in the electrolyte is 30 wt %. The expansion rate of the electrochemical device after 600 cycles of Embodiment 17 is 9%.

By comparing Embodiments 1-17 with Comparative Example 1, it can be concluded that the charging cut-off voltage of the first cycle stage is gradually reduced with the increase of the cycle times. Therefore, the gas generation of the electrochemical device can be effectively inhibited, and the expansion rate of the electrochemical device after 700 cycles can be significantly improved. Meanwhile, under the premise of improving the expansion rate of the electrochemical device after 700 cycles, if the voltage drop is faster, the expansion rate of the electrochemical device is relatively smaller, and the charging rate is smaller. The relatively smaller the expansion rate of the electrochemical device is, the lower the initial charging cut-off voltage is. The relatively smaller the expansion rate of the electrochemical device is, the earlier the voltage drop of the first cycle stage is. The expansion rate of the electrochemical device is relatively smaller.

It is understandable that conventional charging generally includes constant-current charging and constant-voltage charging. The constant-current charging generally has a larger current to allow the battery to be charged to an upper limit voltage at a faster rate. During constant-current charging, the greater the charging current is, the faster the release rate of lithium ions from the positive electrode active material is, which more easily leads to particle rupture and oxygen release of the positive electrode active material. The corresponding starting point of voltage drop needs to be advanced. For example, when the constant-current charging current is greater than 2 C, the constant-current charging cut-off voltage is preferably started to drop from 4.2V to 4.18V before less than 300 cycles, otherwise, the voltage drop may be delayed (for example, when the constant-current charging current is less than 2 C, the constant-current charging cut-off voltage may be started to drop from 4.2V to 4.18V after more than 300 cycles). In addition, the greater the constant-current charging current is, the greater the polarization of the electrochemical device is, which will more easily lead to the particle rupture and oxygen release of the positive electrode active material, and the voltage can be reduced to a lower constant-current charging cut-off voltage earlier. For example, before 300 cycles, the cut-off voltage is dropped from 4.2V to 4.15V. The higher the upper limit voltage of charging is, the more lithium ions are extracted from the positive electrode active material, which will more easily lead to the particle rupture and oxygen release of the positive electrode active material. The corresponding starting point of voltage drop needs to be advanced, for example, when the cut-off voltage of the first cycle stage is greater than 4.2V, the charging cut-off voltage is preferably started to drop before less than 300 cycles, otherwise the voltage drop may be delayed. For example, when the cut-off voltage of the first cycle stage is less than 4.2V, the charging cut-off voltage may be started to drop after more than 300 cycles.

In one embodiment, temperature is also a factor that aggravates the cyclic gas generation. The higher the temperature is, the corresponding starting point of voltage drop needs to be advanced. For example, when the maximum temperature of the electrochemical device during charging is greater than 50° C., the charging cut-off voltage is preferably started top drop before less than 300 cycles, otherwise, the voltage drop may be delayed (for example, when the maximum temperature of the electrochemical device during charging is less than 45° C., the charging cut-off voltage may be started to drop after more than 300 cycles. The temperature may refer to the ambient temperature or self-heat generation during the application of the electrochemical device. If the temperature refers to the self-heat generation heat during the application of the electrochemical device, a soft-packed multi-tab electrochemical device has the characteristics of low temperature rise. Therefore, the corresponding starting point of voltage drop may be delayed, and the charging cut-off voltage can be started to drop after more than 300 cycles. For the electrochemical device with a non-multi-tab structure, the charging cut-off voltage is preferably started to drop after less than 300 cycles.

As shown in Tables 3-4 below, the charging parameters and the expansion rate of the electrochemical device of Embodiments 18-21 are summarized.

TABLE 3

| Embodiments | Constant-charging current/C | Cut-off voltage/V of first cycle stage | Times of first cycle stage | Cut-off voltage/V of second cycle stage | Times of second cycle stage | Cut-off voltage/V of third cycle stage | Times of third cycle stage | Cut-off voltage/V of fourth cycle stage | Times of fourth cycle stage | Cut-off voltage/V of fifth cycle stage | Times of fifth cycle stage |
| --- | --- | --- | --- | --- | --- | --- | --- | --- | --- | --- | --- |
| 18 | 1.5 | 4.2 | 300 | 4.18 | 100 | 4.15 | 100 | 4.1 | 100 | 4 | 100 |
| 19 | 1.5 | 4.2 | 300 | 4.18 | 100 | 4.15 | 100 | 4.1 | 100 | 4 | 100 |
| 20 | 1.5 | 4.2 | 300 | 4.18 | 100 | 4.15 | 100 | 4.1 | 100 | 4 | 100 |
| 21 | 1.5 | 4.2 | 300 | 4.18 | 100 | 4.15 | 100 | 4.1 | 100 | 4 | 100 |

TABLE 4

| Embodiments | Ethylene carbonate/dimethyl carbonate content in electrolyte | Positive electrode active material | Particle type | Dv50/μm of the positive electrode active material | Electrode assembly structure | Expansion rate of the electrochemical device after 700 cycles |
| --- | --- | --- | --- | --- | --- | --- |
| 18 | 10 wt % | $LiNi_{0.8}Co_{0.1}Mn_{0.1}O_2$ | Seconclaty particles | 8.5 | Full tab structure (one tab for each layer of positive electrode piece) | 7.0% |
| 19 | 15 wt % | $LiNi_{0.8}Co_{0.1}Mn_{0.1}O_2$ | Seconclaty particles | 8.5 | Full tab structure (one tab for each layer of positive electrode piece) | 8.0% |
| 20 | 25 wt % | $LiNi_{0.8}Co_{0.1}Mn_{0.1}O_2$ | Seconclaty particles | 8.5 | Full tab structure (one tab for each layer of positive electrode piece) | 12.0% |
| 21 | 30 wt % | $LiNi_{0.8}Co_{0.1}Mn_{0.1}O_2$ | Seconclaty particles | 8.5 | Full tab structure (one tab for each layer of positive electrode piece) | 15.0% |

Embodiment 18

Ambient temperature: 25° C.; ethylene carbonate/dimethyl carbonate content in the electrolyte: 10 wt %; positive electrode active material: $LiNi_{0.8}Co_{0.1}Mn_{0.1}O_2$; particle type: secondary particles; Dv50/μm of the positive electrode active material: 8.5; electrode assembly structure: wound full tab structure (one tab for each layer of positive electrode piece);

The charging and discharging process of the first cycle stage:
- Step 1: the electrochemical device 13 is charged by using the constant current of 1.5 C until the voltage of the electrochemical device reaches the cut-off voltage of 4.2V;
- Step 2: the electrochemical device 13 is charged by using the constant voltage of 4.2V until the current of the electrochemical device reaches the preset cut-off current (0.05 C);
- Step 3: the electrochemical device 13 is discharged to the preset discharging cut-off voltage by using the preset discharging current;
- Step 4: the above steps 1 to 3 are repeated for 300 times, that is, the electrochemical device 13 is subjected to 300 charging and discharging cycles.

The charging and discharging process of the second cycle stage:
- Step 1: the electrochemical device 13 is charged by using the constant current of 1.5 C until the voltage of the electrochemical device reaches the cut-off voltage of 4.18V;
- Step 2: the electrochemical device 13 is charged by using the constant voltage of 4.18V until the current of the electrochemical device reaches the preset cut-off current (0.05 C);
- Step 3: the electrochemical device 13 is discharged to the preset discharging cut-off voltage by using the preset discharging current;
- Step 4: the above steps 1 to 3 are repeated for 100 times, that is, the electrochemical device 13 is subjected to 100 charging and discharging cycles.

The charging and discharging process of the third cycle stage:
- Step 1: the electrochemical device 13 is charged by using the constant current of 1.5 C until the voltage of the electrochemical device reaches the cut-off voltage of 4.15V;
- Step 2: the electrochemical device 13 is charged by using the constant voltage of 4.15V until the current of the electrochemical device reaches the preset cut-off current (0.05 C);
- Step 3: the electrochemical device 13 is discharged to the preset discharging cut-off voltage by using the preset discharging current;
- Step 4: the above steps 1 to 3 are repeated for 100 times, that is, the electrochemical device 13 is subjected to 100 charging and discharging cycles.

The charging and discharging process of the fourth cycle stage:
- Step 1: the electrochemical device 13 is charged by using the constant current of 1.5 C until the voltage of the electrochemical device reaches the cut-off voltage 4.1V;
- Step 2: the electrochemical device 13 is charged by using the constant voltage of 4.1V until the current of the electrochemical device reaches the preset cut-off current (0.05 C);
- Step 3: the electrochemical device 13 is discharged to the preset discharging cut-off voltage by using the preset discharging current;
- Step 4: the above steps 1 to 3 are repeated for 100 times, that is, the electrochemical device 13 is subjected to 100 charging and discharging cycles.

The charging and discharging process of the fifth cycle stage:
- Step 1: the electrochemical device 13 is charged by using the constant current of 1.5 C until the voltage of the electrochemical device reaches the cut-off voltage of 4V;
- Step 2: the electrochemical device 13 is charged by using the constant voltage of 4V until the current of the electrochemical device reaches the preset cut-off current (0.05 C);
- Step 3: the electrochemical device 13 is discharged to the preset discharging cut-off voltage by using the preset discharging current;
- Step 4: the above steps 1 to 3 are repeated for 100 times, that is, the electrochemical device 13 is subjected to 100 charging and discharging cycles.

After the electrochemical device 13 passes five cycles, the expansion rate of the electrochemical device is measured to be 7%, that is, the expansion rate of the electrochemical device after 700 cycles of Embodiment 18 is 7%.

Embodiment 19 is basically the same as Embodiment 18, except that in Embodiment 19, the ethylene carbonate/dimethyl carbonate content in the electrolyte is 15 wt %. The expansion rate of the electrochemical device after 700 cycles of Embodiment 19 is 8%.

Embodiment 20 is basically the same as Embodiment 18, except that in Embodiment 20, the ethylene carbonate/dimethyl carbonate content in the electrolyte is 25 wt %. The expansion rate of the electrochemical device after 700 cycles of Embodiment 20 is 12%.

Embodiment 21 is basically the same as Embodiment 18, except that in Embodiment 21, the ethylene carbonate/dimethyl carbonate content in the electrolyte is 30 wt %. The expansion rate of the electrochemical device after 700 cycles of Embodiment 21 is 15%.

From Embodiments 18 to 21 shown in Tables 3-4 above, it can be concluded that the charging cut-off voltage of the first cycle stage is gradually reduced with the increase of the cycle times. Therefore, the gas generation of the electrochemical device can be effectively inhibited, and the expansion rate of the electrochemical device after 700 cycles can be significantly improved. Meanwhile, the lower the ethylene carbonate/dimethyl carbonate content in the electrolyte is, the smaller the expansion rate of the electrochemical device is.

As shown in Tables 5-6 below, the charging parameters and the expansion rate of the electrochemical device of Embodiments 22 to 29 are summarized.

TABLE 5

| Embodiments | Constant-charging current/C | Cut-off voltage/V of first cycle stage | Times of first cycle stage | Cut-off voltage/V of second cycle stage | Times of second cycle stage | Cut-off voltage/V of third cycle stage | Times of third cycle stage | Cut-off voltage/V of fourth cycle stage | Times of fourth cycle stage | Cut-off voltage/V of fifth cycle stage | Times of fifth cycle stage |
|---|---|---|---|---|---|---|---|---|---|---|---|
| 22 | 1.5 | 4.2 | 300 | 4.18 | 100 | 4.15 | 100 | 4.1 | 100 | 4 | 100 |
| 23 | 1.5 | 4.2 | 300 | 4.18 | 100 | 4.15 | 100 | 4.1 | 100 | 4 | 100 |
| 24 | 1.5 | 4.2 | 300 | 4.18 | 100 | 4.15 | 100 | 4.1 | 100 | 4 | 100 |
| 25 | 1.5 | 4.2 | 300 | 4.18 | 100 | 4.15 | 100 | 4.1 | 100 | 4 | 100 |
| 26 | 1.5 | 4.2 | 300 | 4.18 | 100 | 4.15 | 100 | 4.1 | 100 | 4 | 100 |
| 27 | 1.5 | 4.2 | 300 | 4.18 | 100 | 4.15 | 100 | 4.1 | 100 | 4 | 100 |
| 28 | 1.5 | 4.2 | 300 | 4.18 | 100 | 4.15 | 100 | 4.1 | 100 | 4 | 100 |
| 29 | 1.5 | 4.2 | 300 | 4.18 | 100 | 4.15 | 100 | 4.1 | 100 | 4 | 100 |

TABLE 6

| Embodiments | Ethylene carbonate/dimethyl carbonate content in electrolyte | Positive electrode active material | Particle type | Dv50/μm of the positive electrode active material | Electrode assembly structure | Expansion rate of the electrochemical device after 700 cycles |
|---|---|---|---|---|---|---|
| 22 | 20 wt % | $LiNi_{0.8}Co_{0.1}Mn_{0.1}O_2$ | Secondary particles | 5.0 | Full tab structure (one tab for each layer of positive electrode piece) | 8.0% |
| 23 | 20 wt % | $LiNi_{0.8}Co_{0.1}Mn_{0.1}O_2$ | Secondary particles | 7.5 | Full tab structure (one tab for each layer of positive electrode piece) | 9.0% |
| 24 | 20 wt % | $LiNi_{0.8}Co_{0.1}Mn_{0.1}O_2$ | Secondary particles | 9.5 | Full tab structure (one tab for each layer of positive electrode piece) | 11.0% |
| 25 | 20 wt % | $LiNi_{0.8}Co_{0.1}Mn_{0.1}O_2$ | Secondary particles | 12.0 | Full tab structure (one tab for each layer of positive electrode piece) | 12.0% |
| 26 | 20 wt % | $LiNi_{0.8}Co_{0.1}Mn_{0.1}O_2$ | Secondary particles | 15.0 | Full tab structure (one tab for each layer of positive electrode piece) | 13.0% |
| 27 | 20 wt % | $LiNi_{0.6}Co_{0.2}Mn_{0.2}O_2$ | Secondary particles | 8.5 | Full tab structure (one tab for each layer of positive electrode piece) | 7.0% |
| 28 | 20 wt % | $LiNi_{0.88}Co_{0.1}Mn_{0.02}O_2$ | Secondary particles | 8.5 | Full tab structure (one tab for each layer of positive electrode piece) | 16.0% |
| 29 | 20 wt % | $LiNi_{0.8}Co_{0.1}Mn_{0.1}O_2$ | Primary particles | 8.5 | Full tab structure (one tab for each layer of positive electrode piece) | 8.0% |

Embodiment 22 is basically the same as Embodiment 1, except that in Embodiment 22, Dv50/μm of the positive electrode active material is 5. The expansion rate of the electrochemical device after 700 cycles of Embodiment 22 is 8%.

Embodiment 23 is basically the same as Embodiment 1, except that in Embodiment 23, Dv50/μm of the positive electrode active material is 7.5. The expansion rate of the electrochemical device after 700 cycles of Embodiment 23 is 9%.

Embodiment 24 is basically the same as Embodiment 1, except that in Embodiment 24, Dv50/μm of the positive electrode active material is 9.5. The expansion rate of the electrochemical device after 700 cycles of Embodiment 24 is 11%.

Embodiment 25 is basically the same as Embodiment 1, except that in Embodiment 25, Dv50/μm of the positive electrode active material is 12. The expansion rate of the electrochemical device after 700 cycles of Embodiment 25 is 12%.

Embodiment 26 is basically the same as Embodiment 1, except that in Embodiment 26, Dv50/μm of the positive electrode active material is 5. The expansion rate of the electrochemical device after 700 cycles of Embodiment 26 is 13%.

Embodiment 27 is basically the same as Embodiment 1, except that in Embodiment 27, the positive electrode active material is $LiNi_{0.6}Co_{0.2}Mn_{0.1}O_2$. The expansion rate of the electrochemical device after 700 cycles of Embodiment 27 is 7%.

Embodiment 28 is basically the same as Embodiment 1, except that in Embodiment 28, the positive electrode active material is $LiNi_{0.88}Co_{0.1}Mn_{0.02}O_2$. The expansion rate of the electrochemical device after 700 cycles of Embodiment 28 is 16%.

Embodiment 29 is basically the same as Embodiment 1, except that in Embodiment 29, the type of particles is primary particles. The expansion rate of the electrochemical device after 700 cycles of Embodiment 29 is 8%.

From Embodiments 22 to 29 shown in Tables 5-6 above, it can be concluded that the charging cut-off voltage of the first cycle stage is gradually reduced with the increase of the cycle times. Therefore, the gas generation of the electrochemical device can be effectively inhibited, and the expansion rate of the electrochemical device after 700 cycles can be significantly improved. Meanwhile, the smaller the secondary particles are, the relatively smaller the expansion rate of the electrochemical device is. The lower the Ni content is, the relatively smaller the expansion rate of the electrochemical device is. The expansion rate of the primary particles is less than that of the secondary particles.

As shown in Tables 7-8 below, the charging parameters and the expansion rate of the electrochemical device of Embodiments 30 to 32 are summarized.

positive electrode piece). The expansion rate of the electrochemical device after 700 cycles of Embodiment 32 is 16%.

From Embodiments 30 to 32 shown in Tables 7-8 above, it can be concluded that the charging cut-off voltage of the first cycle stage is gradually reduced with the increase of the cycle times. Therefore, the gas generation of the electrochemical device can be effectively inhibited, and the expansion rate of the electrochemical device after 700 cycles can be significantly improved. Meanwhile, the more the number of the tabs is, the smaller the expansion rate of the electrochemical device is.

In summary, according to the embodiments of the present application, the expansion of the electrochemical device due to gas generation can be effectively alleviated by reducing the constant-current charging cut-off voltage in each cycle stage. The capacity decay trend of the electrochemical device during the cycle can also be effectively alleviated. The strategy of gradient reduction of the constant-current charging cut-off voltage between respective cycle stages of the solution can not only effectively solve the problem of cyclic gas generation, but also does not affect the user experience.

TABLE 7

| Embodiments | Constant-charging current/C | Cut-off voltage/V of first cycle stage | Times of first cycle stage | Cut-off voltage/V of second cycle stage | Times of second cycle stage | Cut-off voltage/V of third cycle stage | Times of third cycle stage | Cut-off voltage/V of fourth cycle stage | Times of fourth cycle stage | Cut-off voltage/V of fifth cycle stage | Times of fifth cycle stage |
|---|---|---|---|---|---|---|---|---|---|---|---|
| 30 | 1.5 | 4.2 | 300 | 4.18 | 200 | 4.1 | 100 | 4.05 | 100 | 4 | 100 |
| 31 | 1.5 | 4.2 | 300 | 4.18 | 200 | 4.1 | 100 | 4.05 | 100 | 4 | 100 |
| 32 | 1.5 | 4.2 | 300 | 4.18 | 200 | 4.1 | 100 | 4.05 | 100 | 4 | 100 |

TABLE 8

| Embodiments | Ethylene carbonate/dimethyl carbonate content in electrolyte | Positive electrode active material | Particle type | Dv50/μm of the positive electrode active material | Electrode assembly structure | Expansion rate of the electrochemical device after 700 cycles |
|---|---|---|---|---|---|---|
| 30 | 20 wt % | $LiNi_{0.8}Co_{0.1}Mn_{0.1}O_2$ | Secondary particles | 8.5 | Half tab structure (one tab for every circle of positive electrode piece) | 12.0% |
| 31 | 20 wt % | $LiNi_{0.8}Co_{0.1}Mn_{0.1}O_2$ | Secondary particles | 8.5 | 1/4 tab structure (one tab for every two circles of positive electrode piece) | 14.0% |
| 32 | 20 wt % | $LiNi_{0.8}Co_{0.1}Mn_{0.1}O_2$ | Secondary particles | 8.5 | Single tab structure | 16.0% |

Embodiment 30 is basically the same as Embodiment 1, except that in Embodiment 30, the electrode assembly structure is a half tab structure (one tab for each circle of the positive electrode piece). The expansion rate of the electrochemical device after 700 cycles of Embodiment 30 is 12%.

Embodiment 31 is basically the same as Embodiment 1, except that in Embodiment 31, the electrode assembly structure is a ¼ tab structure (one tab for every two circles of the positive electrode piece). The expansion rate of the electrochemical device after 700 cycles of Embodiment 31 is 14%.

Figure 9:
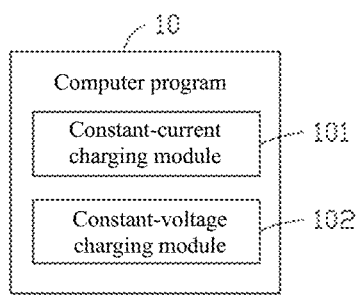
FIG. 9 is a functional module diagram of a computer program according to an embodiment of the present application.

Embodiment 32 is basically the same as Embodiment 1, except that in Embodiment 32, the electrode assembly structure is a single tab structure (only one tab for the Please refer to FIG. 9, in the present embodiment, the computer program 10 may be divided into one or more modules. The one or more modules may be stored in the processor 11 and the charging method according to the embodiment of the present application is executed by the processor 11. The one or more modules may be a series of computer program instruction segments capable of completing specific functions. The instruction segments are used to describe the execution process of the computer program 10 in the electronic device 100. For example, the computer program 10 may be divided into a constant-current charging module 101 and a constant-voltage charging module 102 in FIG. 9.

In the first cycle stage, the constant-current charging module 101 is used to charge the electrochemical device 13 until the voltage of the electrochemical device 13 reaches the first cut-off voltage.

In the second cycle stage, the constant-current charging module 101 is also used to charge the electrochemical device 13 until the voltage of the electrochemical device 13 reaches the second cut-off voltage, wherein the second cut-off voltage is less than the first cut-off voltage.

In the first cycle stage, the constant-voltage charging module 102 is used to charge the electrochemical device 13 until the current of the electrochemical device 13 reaches the first cut-off current.

In the second cycle stage, the constant-voltage charging module 102 is also used to charge the electrochemical device 13 until the current of the electrochemical device 13 reaches the second cut-off current, wherein the second cut-off current is greater than or equal to the first cut-off current.

By executing the computer program 10 through the processor 11, the electrochemical device 13 can be charged and managed, so as to effectively solve the problem of cyclic gas generation without affecting the user experience. The specific content may refer to the embodiments of the charging method for an electrochemical device described above, which will not be described in detail here.

If the modules in the computer program 10 are implemented in the form of software functional units and sold or used as independent products, the modules may be stored in a computer-readable storage medium. Based on such understanding, the present application may also implement all or part of the processes in the method of the above embodiments by instructing relevant hardware through the computer program. The computer program may be stored in the computer-readable storage medium. When the computer program is executed by the processor, the steps of the above respective method embodiments may be implemented. The computer program includes computer program codes, and the computer program codes may be in the form of source codes, object codes, executable files, or some intermediate forms. The computer-readable medium may include: any entity or device capable of carrying the computer program codes, a recording medium, a U disk, a mobile hard disk, a magnetic disk, an optical disk, a computer memory, a read-only memory (ROM), a random access memory (RAM), an electrical carrier signal, a telecommunication signal, and a software distribution medium, etc. It should be noted that the content contained in the computer-readable medium may be appropriately added or deleted according to the requirements of the legislation and patent practice in jurisdictions. For example, in some jurisdictions, according to the legislation and patent practice, the computer-readable medium does not include the electrical carrier signal and telecommunication signal.

It can be understood that the module division described above is a logical function division, and there may be other division manners in actual implementation. In addition, respective functional modules in the various embodiments of the present application may be integrated in the same processing unit, or each module may exist separately physically, or two or more modules may be integrated in the same unit. The above integrated modules may be implemented in the form of hardware, or in the form of the hardware plus software functional modules.

In another embodiment, the electronic device 100 may further include a memory (not shown), and the one or more modules may also be stored in the memory and executed by the processor 11. The memory may be an internal memory of the electronic device 100, that is, a memory built in the electronic device 100. In other embodiments, the memory may also be an external memory of the electronic device 100, that is, a memory externally connected to the electronic device 100.

In some embodiments, the memory is used to store program codes and various data, for example, to store the program codes of the computer program 10 installed in the electronic device 100, and to automatically achieve high-speed program or data access during operation of the electronic device 100.

The memory may include the random access memory, and may also include a non-volatile memory, such as a hard disk, a memory, a plug-in hard disk, a smart memory card (SMC), a secure digital (SD) card, a flash card, at least one magnetic disk storage device, a flash memory device, or other non-volatile solid state storage devices.

It is apparent to those skilled in the art that the present application is not limited to the details of the above exemplary embodiments, and the present application can be embodied in other specific forms without departing from the spirit or essential characteristics of the present application. Therefore, the embodiments of the present application should be considered as illustrative and not restrictive from any point, and the scope of the present application is defined by the appended claims rather than the above illustration. Hence, all changes in the meaning and scope of equivalent elements of the claims are included in the present application.

What is claimed is:

1. A method for charging an electrochemical device, the charging comprising n cycle stages in sequence, wherein n is a positive integer greater than or equal to 2, the n cycle stages are respectively defined as $i^{th}$ cycle stages, i=2, 3, . . . , n, each of the $i^{th}$ cycle stages including a respective plurality of charging and discharging cycles, the method comprising:
for a $(i-1)^{th}$ cycle stage comprising a $(i-1)^{th}$ plurality of charging and discharging cycles:
for each of the $(i-1)^{th}$ plurality of charging and discharging cycles:
charging the electrochemical device until a voltage of the electrochemical device reaches a $(i-1)^{th}$ cut-off voltage; and
discharging the electrochemical device to a preset discharging cut-off voltage; and
for a $i^{th}$ cycle stage comprising a $i^{th}$ plurality of charging and discharging cycles:
for each of the $i^{th}$ plurality of charging and discharging cycles:
charging the electrochemical device until a voltage of the electrochemical device reaches a $i^{th}$ cut-off voltage, wherein the $i^{th}$ cut-off voltage is lower than the $(i-1)^{th}$ cut-off voltage; and
discharging the electrochemical device to the preset discharging cut-off voltage.

2. The method according to claim 1, wherein the $i^{th}$ cycle stage comprises a constant-voltage charging stage, and a voltage value of the constant-voltage charging stage of the $i^{th}$ cycle stage is equal to a value of the $i^{th}$ cut-off voltage.

3. The method according to claim 2, wherein a cut-off current of the constant-voltage charging stage of the $i^{th}$ cycle stage is defined as an $i^{th}$ cut-off current, a cut-off current of the constant-voltage charging stage of the $(i-1)^{th}$ cycle stage is defined as a $(i-1)^{th}$ cut-off current, and the $i^{th}$ cut-off current is greater than or equal to the $(i-1)^{th}$ cut-off current.

4. The method according to claim 3, wherein the $i^{th}$ cut-off current is 0.5C to 6C.

5. The method according to claim 1, wherein the $i^{th}$ cycle stage comprises a constant-current charging stage, a current of the constant-current charging stage of the $i^{th}$ cycle stage is defined as an $i^{th}$ current, a current of the constant-current charging stage of the $(i-1)^{th}$ cycle stage is defined as a $(i-1)^{th}$ current, and the $i^{th}$ current is equal to the $(i-1)^{th}$ current.

6. The method according to claim 1, wherein the $i^{th}$ cut-off voltage is 3.8V to 4.3V.

7. The method according to claim 1, wherein the $i^{th}$ cycle stage has 10 to 500 cycles.

8. The method according to claim 1, wherein the electrochemical device comprises an electrode assembly, the electrode assembly comprises a positive electrode, a negative electrode and a separator, and the separator is disposed between the positive electrode and the negative electrode, wherein at least one of the positive electrode and the negative electrode has two or more tabs.

9. The method according to claim 8, wherein the electrode assembly has a wound structure, and at least one of the positive electrode and the negative electrode has a tab every two circles.

10. The method according to claim 8, wherein the positive electrode comprises a positive electrode active material, and the positive electrode active material is at least one of the compounds represented by the chemical formula $Li_\alpha Ni_x Co_y M1_z M2_\beta O_2$, wherein $0.95 \leq \alpha \leq 1.05$, $0.6 \leq x < 1$, $0 < y < 0.4$, $0 < z < 0.4$, $0 \leq \beta \leq 0.05$, $x+y+z+\beta=1$, M1 is at least one element selected from the group consisting of Mn and Al, and M2 is at least one element selected from the group consisting of Mg, Ti, Zr, Nb, Y, Cr, V, Ge, Mo, and Sr.

11. The method according to claim 10, wherein the positive electrode active material has at least one of the following characteristics:
(A) comprising secondary particles;
(B) $Dv10 \geq 5.0$ μm;
(C) $7.5$ μm $< Dv50 < 12.5$ μm; and
(D) $Dv90 \leq 22.0$ μm;
wherein Dv10 represents the particle size reaching 10% of a volume accumulation from a small particle size side in a volume-based particle size distribution; Dv50 represents the particle size reaching 50% of the volume accumulation from the small particle size side in the volume-based particle size distribution; and Dv90 represents the particle size reaching 90% of the volume accumulation from the small particle size side in the volume-based particle size distribution.

12. The method according to claim 1, wherein the positive electrode active material comprises secondary particles; and the positive electrode active material has $Dv10 \geq 5.0$ m, wherein Dv10 represents the particle size reaching 10% of a volume accumulation from a small particle size side in a volume-based particle size distribution.

13. An electronic device, comprising:
an electrochemical device; and
a processor used to execute a method for charging the electrochemical device, the charging comprising n cycle stages in sequence, wherein n is a positive integer greater than or equal to 2, the n cycle stages are respectively defined as $i^{th}$ cycle stages, i=2, 3, ..., n, each of the $i^{th}$ cycle stages including a respective plurality of charging and discharging cycles, the method comprising:
for a $(i-1)^{th}$ cycle stage comprising a $(i-1)^{th}$ plurality of charging and discharging cycles:
for each of the $(i-1)^{th}$ plurality of charging and discharging cycles:
charging the electrochemical device until a voltage of the electrochemical device reaches a $(i-1)^{th}$ cut-off voltage; and
discharging the electrochemical device to a preset discharging cut-off voltage; and
for a $i^{th}$ cycle stage comprising a $i^{th}$ plurality of charging and discharging cycles:
for each of the $i^{th}$ plurality of charging and discharging cycles:
charging the electrochemical device until a voltage of the electrochemical device reaches a $i^{th}$ cut-off voltage, wherein the $i^{th}$ cut-off voltage is lower than the $(i-1)^{th}$ cut-off voltage; and
discharging the electrochemical device to the preset discharging cut-off voltage.

14. The electronic device according to claim 13, wherein the $i^{th}$ cycle stage comprises a constant-voltage charging stage, and a voltage value of the constant-voltage charging stage of the $i^{th}$ cycle stage is equal to a value of the $i^{th}$ cut-off voltage.

15. The electronic device according to claim 14, wherein a cut-off current of the constant-voltage charging stage of the $i^{th}$ cycle stage is defined as an $i^{th}$ cut-off current, a cut-off current of the constant-voltage charging stage of the $(i-1)^{th}$ cycle stage is defined as a $(i-1)^{th}$ cut-off current, and the $i^{th}$ cut-off current is greater than or equal to the $(i-1)^{th}$ cut-off current.

16. The electronic device according to claim 15, wherein the $i^{th}$ cut-off current is 0.5C to 6C.

17. The electronic device according to claim 13, wherein the $i^{th}$ cycle stage comprises a constant-current charging stage, a current of the constant-current charging stage of the $i^{th}$ cycle stage is defined as an $i^{th}$ current, a current of the constant-current charging stage of the $(i-1)^{th}$ cycle stage is defined as a $(i-1)^{th}$ current, and the $i^{th}$ current is equal to the $(i-1)^{th}$ current.

18. The electronic device according to claim 13, wherein the electrochemical device comprises an electrode assembly, the electrode assembly comprises a positive electrode, a negative electrode and a separator, and the separator is disposed between the positive electrode and the negative electrode, wherein at least one of the positive electrode and the negative electrode has two or more tabs, the electrode assembly has a wound structure, and at least one of the positive electrode and the negative electrode has a tab every two circles.

19. The electronic device according to claim 18, wherein the positive electrode comprises a positive electrode active material, and the positive electrode active material is at least one of the compounds represented by the chemical formula $Li_\alpha Ni_x Co_y M1_z M2_\beta O_2$, wherein $0.95 \leq \alpha \leq 1.05$, $0.6 \leq x < 1$, $0 < < 0.4$, $0 < z < 0.4$, $0 \leq \beta \leq 0.05$, $x+y+z+\beta=1$, M1 is at least one element selected from the group consisting of Mn and Al, and M2 is at least one element selected from the group consisting of Mg, Ti, Zr, Nb, Y, Cr, V, Ge, Mo, and Sr, the positive electrode active material has at least one of the following characteristics:
(A) comprising secondary particles;
(B) $Dv10 \geq 5.0$ μm;
(C) $7.5$ μm $< Dv50 < 12.5$ μm; and
(D) $Dv90 \leq 22.0$ μm;
wherein Dv10 represents the particle size reaching 10% of a volume accumulation from a small particle size side in a volume-based particle size distribution; Dv50 represents the particle size reaching 50% of the volume accumulation from the small particle size side in the volume-based particle size distribution; and Dv90 represents the particle size reaching 90% of the volume accumulation from the small particle size side in the volume-based particle size distribution.

\* \* \* \* \*